(12) United States Patent
Quinlan et al.

(10) Patent No.: US 10,043,021 B2
(45) Date of Patent: Aug. 7, 2018

(54) CONTROLLING ACCESS TO APPLICATION DATA

(71) Applicant: BlackBerry Limited, Waterloo (CA)

(72) Inventors: Sean Michael Quinlan, Duvall, WA (US); Haniff Somani, Redwood Shores, CA (US); Sanjiv Maurya, Fremont, CA (US); Peter Barker, Flower Mound, TX (US); Siavash James Joorabchian Hawkins, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 84 days.

(21) Appl. No.: 15/093,183

(22) Filed: Apr. 7, 2016

(65) Prior Publication Data
US 2017/0293769 A1    Oct. 12, 2017

(51) Int. Cl.
*G06F 21/62* (2013.01)
*G06F 3/06* (2006.01)
*G06F 21/60* (2013.01)

(52) U.S. Cl.
CPC ........ *G06F 21/6209* (2013.01); *G06F 3/0622* (2013.01); *G06F 3/0637* (2013.01); *G06F 3/0673* (2013.01); *G06F 21/602* (2013.01)

(58) Field of Classification Search
CPC .. G06F 21/6209; G06F 3/0622; G06F 3/0637; G06F 3/0673; G06F 21/602
See application file for complete search history.

(56) References Cited

U.S. PATENT DOCUMENTS

| 7,934,249 | B2 | 4/2011 | Chan et al. |
| 2006/0112423 | A1 | 5/2006 | Villadiego et al. |
| 2011/0178930 | A1 | 7/2011 | Scheidt et al. |

FOREIGN PATENT DOCUMENTS

WO    2014052069 A1    4/2014

OTHER PUBLICATIONS

Extended European Search Report issued in European Application No. 17163976.8 dated Aug. 16, 2017; 8 pages.

*Primary Examiner* — Oleg Korsak
(74) *Attorney, Agent, or Firm* — Fish & Richardson P.C.

(57) ABSTRACT

A method, system and computer-readable storage medium for controlling access to application data associated with an application configured on a computing device. The method comprises: storing data comprising, for each of a plurality of access levels associated with the application, first data indicative of a combination of one or more credentials associated with the respective access level and an access level key corresponding to the respective access level, the access level key being encrypted by the combination of one or more credentials associated with the respective access level; determining, based on the first data, an access level in the plurality of access levels corresponding to a combination of one or more credentials available to the application; decrypting the access level key in the stored data corresponding to the determined access level using the combination of one or more credentials available to the application; and providing access to encrypted application data associated with the application and corresponding to the determined access level using, at least in part, the decrypted access level key corresponding to the determined access level.

14 Claims, 8 Drawing Sheets

| DATA CATEGORY | ACCESS LEVEL |
|---|---|
| CATEGORY A | L0 |
| CATEGORY B | L1 |
| CATEGORY C | L2 |
| CATEGORY D | L3 |
| DEFAULT | L2 |

*FIG. 2A*

| ACCESS LEVEL | REQUIRED CREDENTIAL(S) |
|---|---|
| 0 | NONE |
| 1 | LAN CREDENTIAL |
| 2 | PASSWORD CREDENTIAL |
| 3 | LAN CREDENTIAL + PASSWORD CREDENTIAL |

*FIG. 2B*

| | VERSION ID | ... |
|---|---|---|
| 302 | DEVICE ID | ... |
| 304 | | |
| 306-0 LEVEL L0 | ACCESS LEVEL KEY DATA 306-0A | LevelKey_L0 |
| | CREDENTIAL META-DATA 306-0B | |
| 306-1 LEVEL L1 | ACCESS LEVEL KEY DATA 306-1A | $E_{C1}[LevelKey\_L1]$ |
| | CREDENTIAL META-DATA 306-1B | CredentialType_L1<br>CredentialSalt_L1<br>CredentialHash_L1 |
| 306-2 LEVEL L2 | ACCESS LEVEL KEY DATA 306-2A | $E_{C2}[LevelKey\_L2]$ |
| | CREDENTIAL META-DATA 306-2B | CredentialType_L2<br>CredentialSalt_L2<br>CredentialHash_L2 |
| 306-3 LEVEL L3 | ACCESS LEVEL KEY DATA 306-3A | $E_{C3}[LevelKey\_L3]$ |
| | CREDENTIAL META-DATA 306-3B | CredentialType_L3<br>CredentialSalt_L3<br>CredentialHash_L3 |

*FIG. 3A*

300

| | | |
|---|---|---|
| VERSION ID | | |
| RECOVERY | $E_{MCK}(\text{LevelKey\_L3})$ | |
| LEVEL 0 | CONTAINER KEY 326-0A | $E_{\text{LevelKey\_L0}}[\text{ContainerKey\_A}]$ |
| | ACCESS LEVEL KEYS 326-0B | |
| | MANAGEMENT KEY 326-0C | |
| | MASTER KEY 326-0D | |
| LEVEL 1 | CONTAINER KEY 326-1A | $E_{\text{LevelKey\_L1}}[\text{ContainerKey\_B}]$ |
| | ACCESS LEVEL KEYS 326-1B | $E_{\text{LevelKey\_L1}}[\text{LevelKey\_L0}]$ |
| | MANAGEMENT KEY 326-1C | |
| | MASTER KEY 326-1D | |
| LEVEL 2 | CONTAINER KEY 326-2A | $E_{\text{LevelKey\_L2}}[\text{ContainerKey\_C}]$ |
| | ACCESS LEVEL KEYS 326-2B | $E_{\text{LevelKey\_L2}}[\text{LevelKey\_L0}]$ <br> $E_{\text{LevelKey\_L2}}[\text{LevelKey\_L1}]$ |
| | MANAGEMENT KEY 326-2C | $E_{\text{LevelKey\_L2}}[\text{MgtContainerKey}]$ |
| | MASTER KEY 326-2D | |
| LEVEL 3 | CONTAINER KEY 326-3A | $E_{\text{LevelKey\_L3}}[\text{ContainerKey\_D}]$ |
| | ACCESS LEVEL KEYS 326-3B | $E_{\text{LevelKey\_L3}}[\text{LevelKey\_L0}]$ <br> $E_{\text{LevelKey\_L3}}[\text{LevelKey\_L1}]$ <br> $E_{\text{LevelKey\_L3}}[\text{LevelKey\_L2}]$ |
| | MANAGEMENT KEY 326-3C | |
| | MASTER KEY 326-3D | $E_{\text{LevelKey\_L3}}(\text{MCK})$ |

*FIG. 3B*

CONTROLLING ACCESS TO APPLICATION DATA

BACKGROUND OF THE INVENTION

Field of the Invention

Embodiments of the present disclosure relate to controlling access to application data on a computing device.

Description of the Related Technology

Secure platforms provide an architecture for deployment and management of secure applications running on computing devices. A secure application enables an enterprise to deploy sensitive data to the respective computing devices, and to remotely manage the sensitive data in a secure manner. For example, such management may include remote deletion of the sensitive data in the event that the computing device is compromised or in the event that the user of the computing device leaves the employment of the enterprise.

At least some of the data managed by the secure application running on the mobile device is stored in encrypted format. The data may be encrypted using methods as known in the art. For example, the encryption may be employed in "containerization" techniques, according to which the data is encrypted and subject to various access policies which are applied to control how and when users can access the data within the container. The access policies can, for example, be determined and varied if desired by a remote user, such as an administrator of the enterprise which has deployed the secure application.

An example of a secure platform which employs secure applications in this manner is the Good Dynamics™ mobile platform developed by Good Technology™ of Sunnyvale, Calif., United States of America.

SUMMARY

According to a first aspect of the present disclosure, there is provided a method of controlling access to application data associated with an application configured on a computing device, the method comprising: storing data comprising, for each of a plurality of access levels associated with the application, first data indicative of a combination of one or more credentials associated with the respective access level and an access level key corresponding to the respective access level, the access level key being encrypted by the combination of one or more credentials associated with the respective access level; determining, based on the first data, an access level in the plurality of access levels corresponding to a combination of one or more credentials available to the application; decrypting the access level key in the stored data corresponding to the determined access level using the combination of one or more credentials available to the application; and providing access to encrypted application data associated with the application and corresponding to the determined access level using, at least in part, the decrypted access level key corresponding to the determined access level.

According to some embodiments the stored data comprises, for the determined access level, one or more access level keys corresponding to one or more access levels in the plurality of access levels which are subordinate to the determined access level, each of which is encrypted using the access level key corresponding to the determined access level, the method comprising: decrypting the one or more access level keys corresponding to the one or more access levels subordinate to the determined access levels using the decrypted access level key corresponding to the determined access level; and providing access to encrypted application data associated with the application and corresponding to the one or more subordinate access levels using, at least in part, the one or more decrypted access level keys corresponding to the one or more access levels subordinate to the determined access levels.

According to some embodiments the stored data comprises, for each of the plurality of access levels associated with the application, one or more application data keys corresponding to the respective access level, each of which is encrypted by the access level key corresponding to the respective access level, the method comprising: decrypting the one or more application data keys corresponding to the determined access level using the decrypted access level key corresponding to the determined access level; and decrypting the encrypted application data associated with the application and corresponding to the determined access level using the one or more decrypted application data keys.

According to some embodiments the stored data comprises, for each of the plurality of access levels associated with the application, one or more application data keys corresponding to the respective access level, each of which is encrypted by the access level key corresponding to the respective access level, the method comprising: decrypting the one or more application data keys corresponding to the determined access level using the decrypted access level key corresponding to the determined access level; decrypting the one or more application data keys corresponding to the one or more access levels subordinate to the determined access level using the one or more decrypted access level keys corresponding to the one or more access levels subordinate to the determined access level; decrypting the encrypted application data associated with the application and corresponding to the determined access level using the one or more decrypted application data keys; and decrypting the encrypted application data associated with the application and corresponding to the one or more access levels subordinate to the determined access level using the one or more decrypted application data keys corresponding to the one or more access levels subordinate to the determined access level.

According to some embodiments the stored data comprises a master key encrypted by the access level key corresponding to the highest access level associated with the application and the access level key corresponding to the highest access level associated with the application encrypted by the master key, the method comprising: receiving, at the application, a new combination of one or more credentials corresponding to the new access level in response to an instruction to create a new access level above the highest access level associated with the application; generating a new access level key corresponding to the new access level based, in part, on the new combination of one or more credentials received at the application; decrypting the master key using the access level key corresponding to the highest access level associated with the application; encrypting the new access level key corresponding to the new access level using the decrypted master key; and storing the encrypted new access level key in association with the new access level in the stored data.

According to some embodiments the method further comprises: encrypting the decrypted master key using new level key corresponding to the new access level; and storing the encrypted master key in association with the new access level in the stored data.

According to some embodiments the instruction to create a new access level is received from a server remote from the computing device.

According to some embodiments the first data comprises meta-data indicative of the combination of one or more credentials.

According to a second aspect of the present disclosure, there is provided a non-transitory computer-readable storage medium comprising computer-executable instructions which, when executed by a processor, cause a computing device to perform a method of controlling access to application data associated with an application configured on the computing device, the method comprising: storing data comprising, for each of a plurality of access levels associated with the application, first data indicative of a combination of one or more credentials associated with the respective access level and an access level key corresponding to the respective access level, the access level key being encrypted by the combination of one or more credentials associated with the respective access level; determining, based on the first data, an access level in the plurality of access levels corresponding to a combination of one or more credentials available to the application; decrypting the access level key in the stored data corresponding to the determined access level using the combination of one or more credentials available to the application; and providing access to encrypted application data associated with the application and corresponding to the determined access level using, at least in part, the decrypted access level key corresponding to the determined access level.

According to some embodiments the stored data comprises, for the determined access level, one or more access level keys corresponding to one or more access levels in the plurality of access levels which are subordinate to the determined access level, each of which is encrypted using the access level key corresponding to the determined access level, the method comprising: decrypting the one or more access level keys corresponding to the one or more access levels subordinate to the determined access levels using the decrypted access level key corresponding to the determined access level; and providing access to encrypted application data associated with the application and corresponding to the one or more subordinate access levels using, at least in part, the one or more decrypted access level keys corresponding to the one or more access levels subordinate to the determined access levels.

According to some embodiments the stored data comprises, for each of the plurality of access levels associated with the application, one or more application data keys corresponding to the respective access level, each of which is encrypted by the access level key corresponding to the respective access level, the method comprising: decrypting the one or more application data keys corresponding to the determined access level using the decrypted access level key corresponding to the determined access level; decrypting the encrypted application data associated with the application and corresponding to the determined access level using the one or more decrypted application data keys.

According to some embodiments the stored data comprises, for each of the plurality of access levels associated with the application, one or more application data keys corresponding to the respective access level, each of which is encrypted by the access level key corresponding to the respective access level, the method comprising: decrypting the one or more application data keys corresponding to the determined access level using the decrypted access level key corresponding to the determined access level; decrypting the one or more application data keys corresponding to the one or more access levels subordinate to the determined access level using the one or more decrypted access level keys corresponding to the one or more access levels subordinate to the determined access level; decrypting the encrypted application data associated with the application and corresponding to the determined access level using the one or more decrypted application data keys; and decrypting the encrypted application data associated with the application and corresponding to the one or more access levels subordinate to the determined access level using the one or more decrypted application data keys corresponding to the one or more access levels subordinate to the determined access level.

According to some embodiments the stored data comprises a master key encrypted by the access level key corresponding to the highest access level associated with the application and the access level key corresponding to the highest access level associated with the application encrypted by the master key, the method comprising: receiving, at the application, a new combination of one or more credentials corresponding to the new access level in response to an instruction to create a new access level above the highest access level associated with the application; generating a new access level key corresponding to the new access level based, in part, on the new combination of one or more credentials at the application; decrypting the master key using the access level key corresponding to the highest access level associated with the application; encrypting the new access level key corresponding to the new access level using the decrypted master key; and storing the encrypted new access level key in association with the new access level in the stored data.

The non-transitory computer-readable storage medium of claim 12, wherein the method further comprises: encrypting the decrypted master key using new level key corresponding to the new access level; and storing the encrypted master key in association with the new access level in the stored data.

According to some embodiments the instruction to create a new access level is received from a server remote from the computing device.

According to some embodiments the first data comprises meta-data indicative of the combination of one or more credentials.

BRIEF DESCRIPTION OF THE DRAWINGS

Further features and advantages of the invention will become apparent from the following description of preferred embodiments of the invention, given by way of example only, which is made with reference to the accompanying drawings.

FIG. 2A is a schematic diagram showing a first policy data structure defining an access policy in accordance with an embodiment.

FIG. 2B is a schematic diagram showing a second policy data structure defining a credential policy in accordance with an embodiment.

FIG. 3A is a schematic diagram showing a first key data structure storing access level keys in accordance with an embodiment.

FIG. 3B is a schematic diagram showing a second key data structure storing container level keys in accordance with an embodiment.

In the drawings, components, steps and features which appears on two or more Figures have been assigned the same reference numeral for clarity.

DETAILED DESCRIPTION OF CERTAIN INVENTIVE EMBODIMENTS

Figure 1:
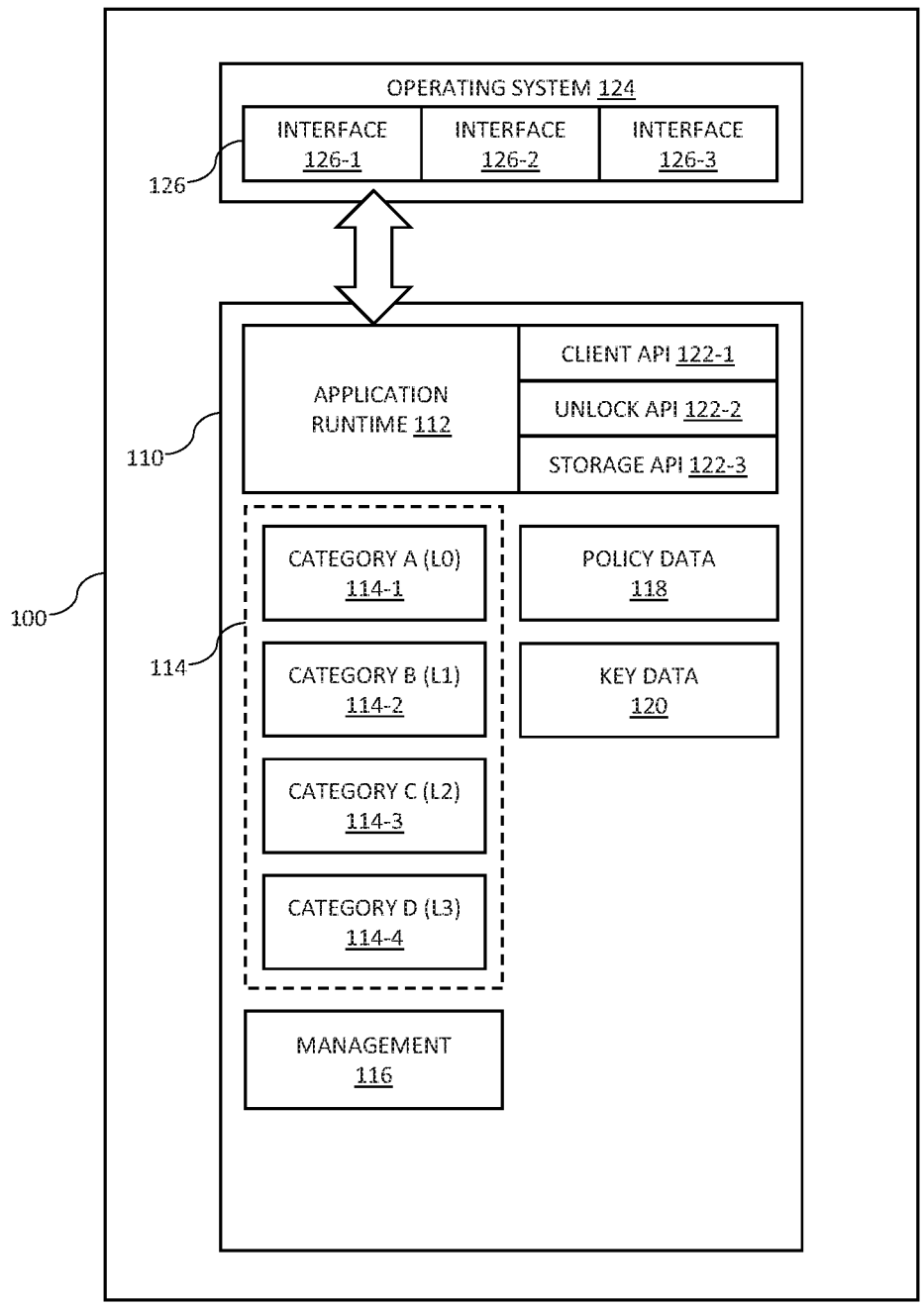
FIG. 1 is a schematic diagram showing a computing device comprising an application in accordance with a first embodiment.

FIG. 1 is a schematic diagram which shows a computing device 100 comprising an application 110 configured to selectively provide access to application data 114 in accordance with an embodiment. The application 110 is configured to interact with an operating system 124 configured on the computing device 100, and includes an application runtime 112 (i.e. a runtime process executed by the operating system 124), and application data 114 and management data 116 stored in a persistent memory (not shown) of the computing device 100. The application data 114 comprises data utilized or generated by the application runtime 112 during execution. The application data 114 includes a plurality of data structures 114-1 to 114-4 (hereinafter termed "containers") into which the application data 114 may be segregated and securely stored in encrypted format to prevent unauthorized access. In this respect, segregation of the application data 114 into the plurality of containers 114-1 to 114-4 may be based on a plurality of data categories defined for the application data 114, as discussed below in more detail. Similarly, the management data 116 may comprise a data structure (hereinafter termed a "management container") in which data for controlling configuration and functionality associated with the application 110 is stored.

The application runtime 112 securely stores application data 114 in the containers 114-1 to 114-4 using cryptographic techniques known in the art, such as those specified in the Advanced Encryption Standard (AES) established by the U.S. National Institute of Standards and Technology. In this context, each secure container 114-1 to 114-4 represents an area of secure storage configured in non-volatile memory and associated with the application 110. Each secure container 114-1 to 114-4 may adopt a plurality of states (hereinafter termed "lock states"), including a locked state and an unlocked state. When in the locked state, the application data 114 stored in the containers 114-1 to 114-4 is encrypted and cannot be accessed by the associated application runtime 112, or any other process running on the computing device 100. Conversely, when the containers 114-1 to 114-4 are in an unlocked state, the application data 114 stored in the containers 114-1 to 114-4 is decrypted (e.g., plaintext) and can be accessed by the corresponding application runtime 112. Encryption and decryption of each container 114-1 to 114-4 is performed by the application runtime 112 using a cryptographic key (hereinafter termed a "container key" or an "application data key") corresponding to the respective container 114-1 to 114-4. The container key is derived from a combination of one or more credentials available to the application runtime 112, as discussed below in more detail. In this respect, it will be appreciated that the lock state for each of the plurality of containers 114-1 to 114-4 can be controlled independently by the application runtime 112.

As discussed above, the application 110 defines a plurality of data categories for data in the application data 114. Each data category is associated with a respective container 114-1 to 114-4, which in turn provides one or more data structures available to the application runtime 112 for storage of application data 114. In the particular example shown in FIG. 1, container 114-1 stores "category A" data, container 114-2 stores "category B" data, container 114-3 stores "category C" data, and container 114-4 stores "category D" data.

The application runtime 112 is configured to manage the lock state of each of the containers 114-1 to 114-4 in accordance with the associated data categories and one or more policies which are defined in policy data 118 stored by the application 110 in non-volatile storage. In particular, each category of data respectively stored in containers 114-1 to 114-4 is associated with an access level defined in the policy data 118. For example, the access policy may define category A data as access level 0 (termed "L0" in FIG. 1), category B data as access level 1 (termed "L1" in FIG. 1), category C data as access level 2 (termed "L2" in FIG. 1), and category D data as access level 3 (termed "L3" in FIG. 1). In this context, the L0 access level represents the lowest sensitivity access level defined in the access policy and the L3 access level represents the highest sensitivity access level defined in the access policy. According to some embodiments, the access policy defined by the policy data 118 may also define a default access level which is applied to data categories for which no access level has been explicitly defined in the policy data 118.

The policy data 118 associated with the application 110 further defines a credential policy which specifies a combination of credentials required to access each respective access level. For example, the credential policy may define that application data 114 associated with the L0 access level (i.e. the category A data stored in container 114-1) can be accessed without requiring any credentials, application data 114 associated with L1 access level (i.e. the category B data stored in container 114-2) can be accessed when the computing device 100 is connected to a particular local area network (hereinafter termed a "LAN credential"), application data 114 associated with the L2 access level (i.e. the category C data stored in container 114-3) can be accessed when a particular password is supplied to the application by a user (hereinafter termed a "password credential"), and application data 114 associated with the L3 access level (i.e. the category D data stored in container 114-4) can been accessed when the application runtime 112 has access to a combination of the password credential and the LAN credential (i.e. a combination of credentials).

As discussed above, application data 114 stored in each of the containers 114-1 to 114-4 is encrypted and decrypted using a container key corresponding to the respective container 114-1 to 114-4. The container keys are stored securely in non-volatile memory associated with the application 110 as key data 120. Specifically, the container keys are stored in key data 120 according to a structure which reflects the access level policy and credential policy defined by the policy data 118. In other words, the key data 120 is configured such that, given access to a particular combination of credentials corresponding to a particular access level as defined in the policy data 118, the application runtime 112 is able to retrieve, from the key data 120, the container keys for each of the container 114-1 to 114-4 assigned to a data category corresponding to the particular access level or lower, but is not able to retrieve, from the key data 120, the credential keys for any container 114-1 to 114-4 assigned to a data category at an access level higher than the particular access level. For example, the key data 120 may be configured such that, given access to a combination of credentials corresponding to the L2 access level, the application runtime 112 is able to access the container keys for container 114-1 (i.e. category A application data), container 114-2 (i.e. category B application data) and container 114-3 (i.e. category C application data), but is not able to access the credential key for container 114-4 (i.e. category D application data). In this context, the one or more credentials currently available to the application runtime 112 may be referred to as a "authentication state", the access level corresponding to a given combination of credentials may be referred to as a "current access level" and each access level below the current access level may be referred to as a "subordinate access level".

As discussed above, the authentication state for the application 110 depends on the one or more credentials available to the application runtime 112 at the time access to the application data 114 is required. In this respect, the application runtime 112 is configured to utilize one or more interfaces 126 provided by the operating system 124 to receive and store (e.g. in non-volatile memory) the one or more credentials. For example, the application runtime 112 may utilize the one or more interfaces 126 to receive input from a user of the computing device 100 (i.e. a "user credential"), information regarding the state or configuration of the computing device 100 or the operating system 124 (i.e. a "configuration credential"), or information regarding the current environment of the computing device 100 (i.e. an "environment credential").

According to some embodiments, the application 110 comprises a plurality of application programming interfaces (APIs), including a client-side API 122-1, an unlock API 122-2 and a storage API 122-3. The client-side API 122-1 provides functionality which enables the application runtime 112 to query the current unlock status for each container 114-1 to 114-4, request a change in lock status for one or more of the containers 114-1 to 114-4 and, where required, to prompt the user of the computing device 100 to provide one or more credentials required for a particular access level. Similarly, the unlock API 122-2 is configured to manage access to the one or more containers 114-1 to 114-4 in accordance with the current authentication state for the application 110 and the access level policy defined in the policy data 118 and reflected in the key data 120. The storage API 122-3 is configured to manage storage of application data 114 in the containers 114-1 to 114-4 in accordance with a data category associated with the data to be stored.

FIGS. 2A and 2B are schematic diagrams showing exemplary structures for data stored in the policy data 118, in accordance with an embodiment. Specifically, FIG. 2A shows an example of a first policy data structure 210 defining the access policy for the application 110. FIG. 2B shows an example of a second policy data structure 220 defining the credential policy, as discussed above with reference to FIG. 1. In the example shown in FIG. 2A, the first policy data structure 210 takes the form of a table, such as a database table, in which the first column 212-1 of the table corresponds to the data category and the second column 212-2 of the table corresponds to the access level. Similarly, each of the rows 214-1 to 214-4 of the table corresponds to the data categories assigned to the respective containers 114-1 to 114-4 of FIG. 1. Thus, according to the example shown in FIG. 2A, row 214-1 specifies that category A data is assigned to access level L0, row 214-2 specifies that category B data is assigned to access level L1, row 214-3 specifies that category C data is assigned to access level L2 and row 214-4 specifies that category D data is assigned to access level L3. As discussed above in relation to FIG. 1, the access policy may also define a default access level, which is reflected in FIG. 2A by row 214-5 which specifies that L2 is the default access level for the application.

The second policy data structure 220 shown in FIG. 2B also takes the form of a table, in which the first column 222-1 corresponds to the access level and the second column 222-2 corresponds to the required credential or credential combination for the respective access level. Similarly, each of the rows 224-1 to 224-4 of the table corresponds to the access levels defined for the application 110 of FIG. 1. Thus, according to the example shown in FIG. 2B, row 224-1 specifies that no credentials are required for access to access level L0 application data, row 224-2 specifies that a LAN credential is required for access to access level L1 application data (hereinafter termed the "L1 credential combination"), row 224-3 specifies that a password credential is required for access to access level L2 application data (hereinafter termed the "L2 credential combination"), and row 224-4 specifies that the LAN credential and the password credential are required for access to access level L3 application data (hereinafter termed the "L3 credential combination").

As discussed above with reference to FIG. 1, the key data 120 securely stores the container keys for containers 114-1 to 114-4 in a manner which reflects the access policy and the credential policy defined in the policy data 118. In this respect, FIGS. 3A and 3B respectively show a first key data structure 300 and a second key data structure 320 for secure storage of the container keys for containers 114-1 to 114-4 in accordance with the access policy and credential policy defined in data structures 210 and 220 of FIGS. 2A and 2B respectively. In this respect, the first key data structure 300 takes the form of a table that is used to store a plurality of access level keys corresponding to respective access levels L0 to L3, defined in policy data structure 210 of FIG. 2A. The first key data structure 300 includes a first row 302 specifying a version identifier for the data structure 300 and a second row 304 specifying a device identifier corresponding to the computing device 100 of FIG. 1. The first key data structure 300 further includes a plurality of rows 306-0 to 306-3 corresponding to each of the access levels L0 to L3 defined in policy data structure 210. In this respect, each row 306-0 to 306-3 stores key data comprising the access level key for the respective access level, encrypted by the credential combination for the respective access level, and meta-data suitable for identifying the credential combination for the respective access level where a corresponding credential combination is specified in the credential policy defined in data structure 220. In the example shown in FIG. 3A, row 306-0 corresponding to the L0 access level stores an unencrypted copy of the L0 access level key and does not store any credential meta-data (because the credential policy defined in data structure 220 specifies that no credentials are required for access to L0 access level data). In contrast, rows 306-1 to 306-3 corresponding to the L1 to L3 access levels respectively, store the access level key for the respective access level encrypted by the credential combination for the respective access level, and credential meta-data for identifying the credential combination for the respective access level. Specifically, key data 306-1A stored in row 306-1 comprises the L1 access level key ($E_{C1}$(LevelKey_L1) encrypted using the credential combination (C1) corresponding to the L1 access level; the key data 306-2A stored in row 306-2 comprises the L2 access level key ($E_{C2}$(LevelKey_L2) encrypted using the credential combination (C2) corresponding to the L2 access level; and the key data 306-3A stored in row 306-3 comprises the L3 access level key ($E_{C3}$(LevelKey_L3) encrypted using the credential combination (C3) corresponding to the L3 access level.

The meta-data stored for each access level in the first key data structure 300, for which a credential combination is specified in the credential policy defined in data structure 220 (i.e. access levels L1, L2 and L3), includes data specifying a credential type, a credential salt and a credential hash for the credential combination corresponding to the respective access level. The credential type provides an indication of the type of credential or credentials in the credential combination and how they are to be combined and correctly processed for decryption of the corresponding access level key. The credential hash specifies the hash value for the particular credential combination (using the respective credential salt) and is used to identify whether current authentication state includes the credential combination corresponding to the respective access level. Thus, in the present example, the credential meta-data 306-1B stored in row 306-1 includes data specifying the credential type (CredentialType_L1), the credential salt (CredentialSalt_L1) and the credential hash (CredentialHash_L1) for the L1 access level; the credential meta-data 306-2B stored in row 306-2 includes data specifying the credential type (CredentialType_L2), the credential salt (CredentialSalt_L2) and the credential hash (CredentialHash_L2) for the L2 access level; and the credential meta-data 306-3B stored in row 306-3 includes data specifying the credential type (CredentialType_L3), the credential salt (CredentialSalt_L3) and the credential hash (CredentialHash_L3) for the L3 access level.

FIG. 3B is a schematic diagram showing the second key data structure 320 which takes the form of a table that is used to store the plurality of container keys for containers 114-1 to 114-4 respectively. In the present example the second key data structure 320 includes a first row 322 specifying a version identifier for the data structure 320 and a second row 324 specifying recovery data which is discussed in more detail below. The second key data structure 320 further includes a plurality of rows 326-0 to 326-3 corresponding to each of the access levels L0 to L3 defined in the access policy stored in policy data structure 210. In this respect, each row 306-0 to 306-3 stores the container keys corresponding to the respective access level, encrypted by the access level key for the respective access level, and the access level keys for each subordinate access level below the respective access level encrypted by the access level key for the access level of the current row. Specifically, row 326-0 stores the container key for the category A container 114-1 encrypted by the L0 access level key ($E_{LevelKey\_L0}$[ContainerKey_A]) in container key data 326-0A, but does not store any access level keys for subordinate access levels because the L0 is the lowest access level defined for the application 110. Row 326-1 stores the container key for the category B container 114-2 encrypted by the L1 access level key ($E_{LevelKey\_L1}$[ContainerKey_B]) in container key data 326-1A and stores the L0 level access key encrypted by the L1 access level key ($E_{LevelKey\_L1}$[LevelKey_L0]) in access level key data 326-1B. Similarly, row 326-2 stores the container key for the category C container 114-3 encrypted by the L2 access level key ($E_{LevelKey\_L2}$[ContainerKey_C]) in container key data 326-2A, and the L0 access level key encrypted by the L2 access level key ($E_{LevelKey\_L2}$[LevelKey_L0]) and the L1 access level key encrypted by the L2 access level key ($E_{LevelKey\_L2}$[LevelKey_L1]) in access level key data 326-2B. Finally, row 326-3 stores the container key for the category D container 114-4 encrypted by the L3 access level key ($E_{LevelKey\_L3}$[ContainerKey_D]) in container key data 326-3A, and the L0 access level key encrypted by the L3 access level key ($E_{LevelKey\_L3}$[LevelKey_L0]), the L1 access level key encrypted by the L3 access level key ($E_{LevelKey\_L3}$[LevelKey_L1]), and the L2 access level key encrypted by the L3 access level key ($E_{LevelKey\_L3}$[LevelKey_L2]), in access level key data 326-3B.

Referring briefly to FIG. 1, in some embodiments the management container stored in management data 116 may also be assigned to a particular access level and encrypted using a corresponding management container key. In the embodiment shown in FIG. 3B, the management data 116 is assigned to the L2 access level and the management container key is stored in row 326-2 of data structure 320 as management key 326-2C data, encrypted by the L2 access level key ($E_{LevelKey\_L2}$[MgtContainerKey]). Thus, the application runtime 112 is able to access the management container stored in the management data 116 when the current authentication state comprises the L2 credential combination.

As discussed above, in some embodiments, the second key data structure 320 may comprise recovery data 324 which enables recovery of encrypted data stored in containers 114-1 to 114-4 in the event that the user forgets the credential combination corresponding to the highest access level defined for the application. In this example, the recovery data includes a copy of the access level key ($E_{MCK}$(LevelKey_L3)) for the highest access level defined for the application (i.e. the L3 access level for the example shown in FIG. 3B) encrypted by a cryptographic key ($E_{MCK}$) stored remote from the computing device 100 (hereinafter termed the "master container key"). Thus, upon provision of the master container key to the application 110 (e.g. in a reset operation initiated by a remote server), the application runtime 112 is able to decrypt the L3 access level key stored in recovery data 324, regain access to the container keys stored in the rows 326-0 to 326-3 and generate a new set of access level keys as necessary.

In a similar manner, row 326-3 may also store a copy of the master container key encrypted by the L3 access level key ($E_{LevelKey\_L3}$(MCK)) such that if the application 110 is reconfigured to specify a new access level higher (L4) than the current highest access level (L3), the application runtime 112 is able to retrieve the master container key from master key data 332-3D (assuming the current authentication state comprises the L3 credential combination) and optionally store a copy of the L4 access level key encrypted by the master container key ($E_{LevelKey\_L4}$(MCK)) in recovery data 324 without needing to request the master container key from the remote server.

Figure 4:
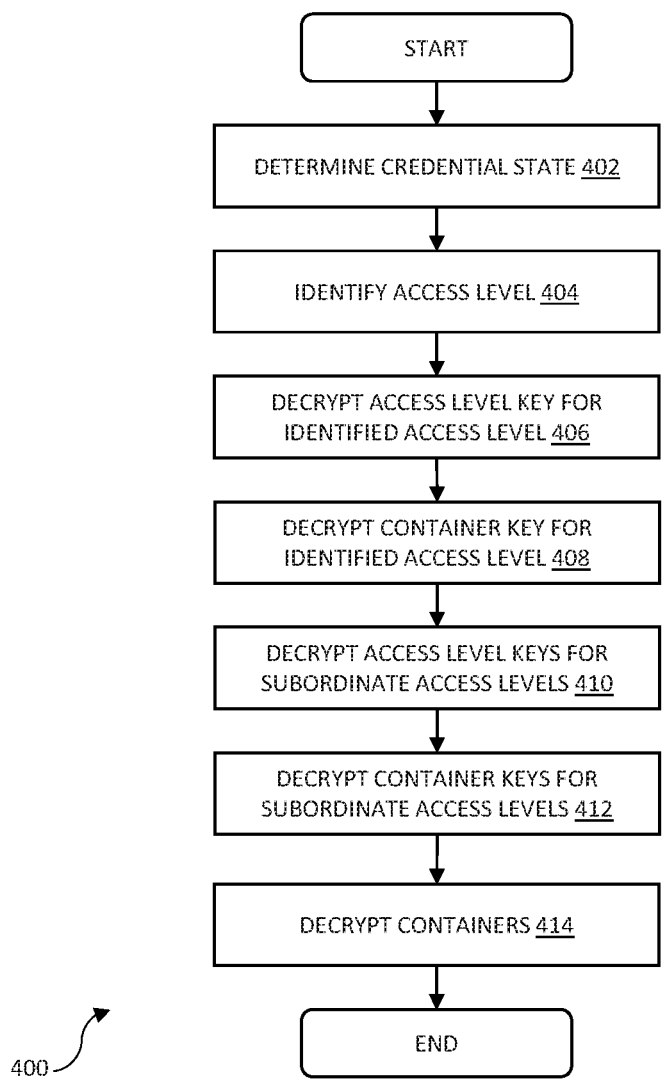
FIG. 4 is a flow diagram showing a method of controlling access to application data in accordance with an embodiment.

FIG. 4 is a flow diagram showing a method 400 performed by the application 110 of FIG. 1 to control access to the application data 114 associated with the application 110 in accordance with the policies defined in the policy data 118 and key data 120. First, the application runtime 112 determines the current credential state for the application 110 [step 402]. In this respect, step 402 may, for example, be performed in response to receipt of one or more credentials, or in response to a request from the application runtime 112 to access the application data 114. Next, the application runtime 112 accesses the credential meta-data stored in the first key data structure 300 and determines the highest access level associated with the current authentication state [step 404]. Next, the application runtime 112 decrypts the access level key stored in the first key data structure 300 and corresponding to the determined access level using the corresponding credential combination [step 406]. Once the access level key corresponding to the determined access level has been decrypted, the application runtime 112 uses the access level key to decrypt the container key corresponding to the identified access level [step 408] and the access level keys for all subordinate access levels relative to the determined access level [step 410]. Next, the application runtime 112 uses the subordinate access level keys obtained at step 410 to decrypt the container keys associated with the subordinate access levels [step 412]. Finally, the application runtime 112 uses the container keys obtained in steps 408 and 412 to decrypt the corresponding containers 114-1 to 114-4 in the application data 114 and provide access to the application data 114 stored therein.

According to some embodiments, the method 400 of FIG. 4 may be performed in response to a request to store or access data associated with a particular data category. In this case, the application runtime 112 may determine, at step 404, whether the current authentication state includes the credential combination corresponding to the particular data category. If the current authentication state does not include the required credential combination, the application runtime 112 may prompt the user to supply one or more additional credentials, or inform the user that access to the required access level is not available.

According to some embodiments, the application 110 may be installed on computing device 100 in an inactive state. In such embodiments, the key data 120 may be generated as part of an activation process for the application 110 and in accordance with the policies defined in the policy data 118. In this respect, the application runtime 112 may be configured to prompt the user of the computing device 100 for one or more credentials as specified in the credential policy stored in policy data 118. Upon receipt of the one or more credentials, the application runtime 112 generates a plurality of access level keys in accordance with the credential policy and a plurality of container keys in accordance with the access policy, and creates the first key data structure 300. Once the access level keys have been generated, the application runtime 112 generates the second key data structure 320 shown in FIG. 3B by encrypting the plurality of container keys using the access level keys and in accordance with the access policy defined in policy 118. Once the container keys have been generated, the respective containers 114-1 to 114-4 can be created or initialized for storage of application data 114.

Figure 5:
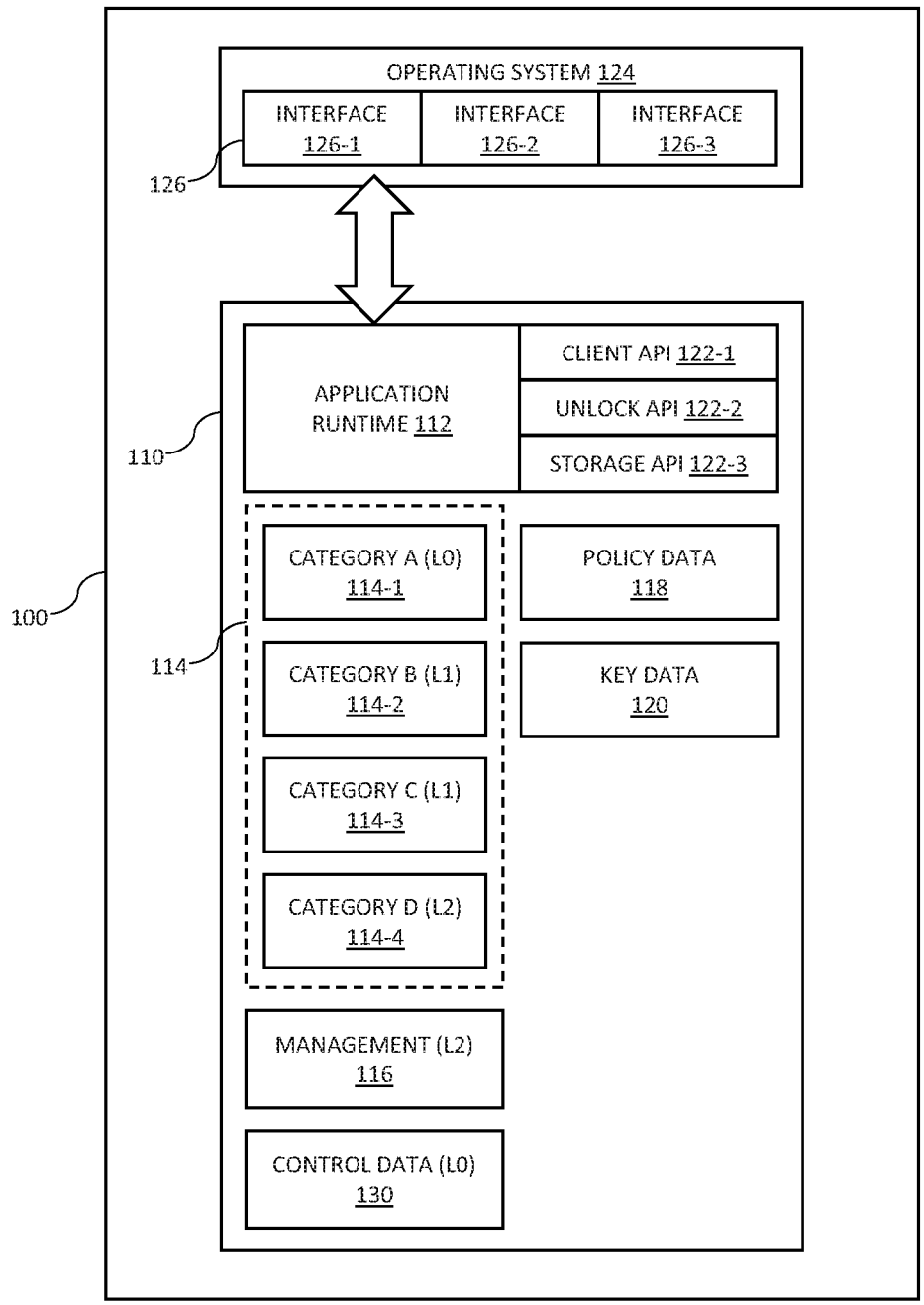
FIG. 5 is a schematic diagram showing a computing device comprising an application in accordance with a second embodiment.

As discussed above, according to some embodiments the management container stored in management data 116 may be assigned to a particular access level and encrypted by the corresponding access level key. Thus, when the current authentication state does not permit access to the access level assigned to the management container, the application runtime 112 is unable to access configuration settings stored in the management data 116. To address this, the application 110 may be configured with separate control data 130 which is assigned to the lowest access level (L0), as shown in the embodiment of FIG. 5. According to such embodiments, the control data 130 is accessible to the application runtime 112 irrespective of the current authentication state. In this manner, the control data 130 may be used to store low sensitivity configuration data that ensures a prescribed minimum level of configuration data is available to the application at all times. For example, where the application 110 is managed by a remote server, the control data may include one or more credentials required to initiate a communication session with remote server, thereby ensuring that the remote server can perform critical operations (e.g. to initialize a remote wipe of the application data 114) in respect of the application even if the management container 116 remains in a locked state. It will be appreciated that the credentials stored in the control data 130 may permit only a limited subset of management functionality appropriate for the L0 access level, whereas the management data 116 may be used to stored credentials which allow the application to initiate a relatively less restricted communication session with the remote server.

Figure 6:
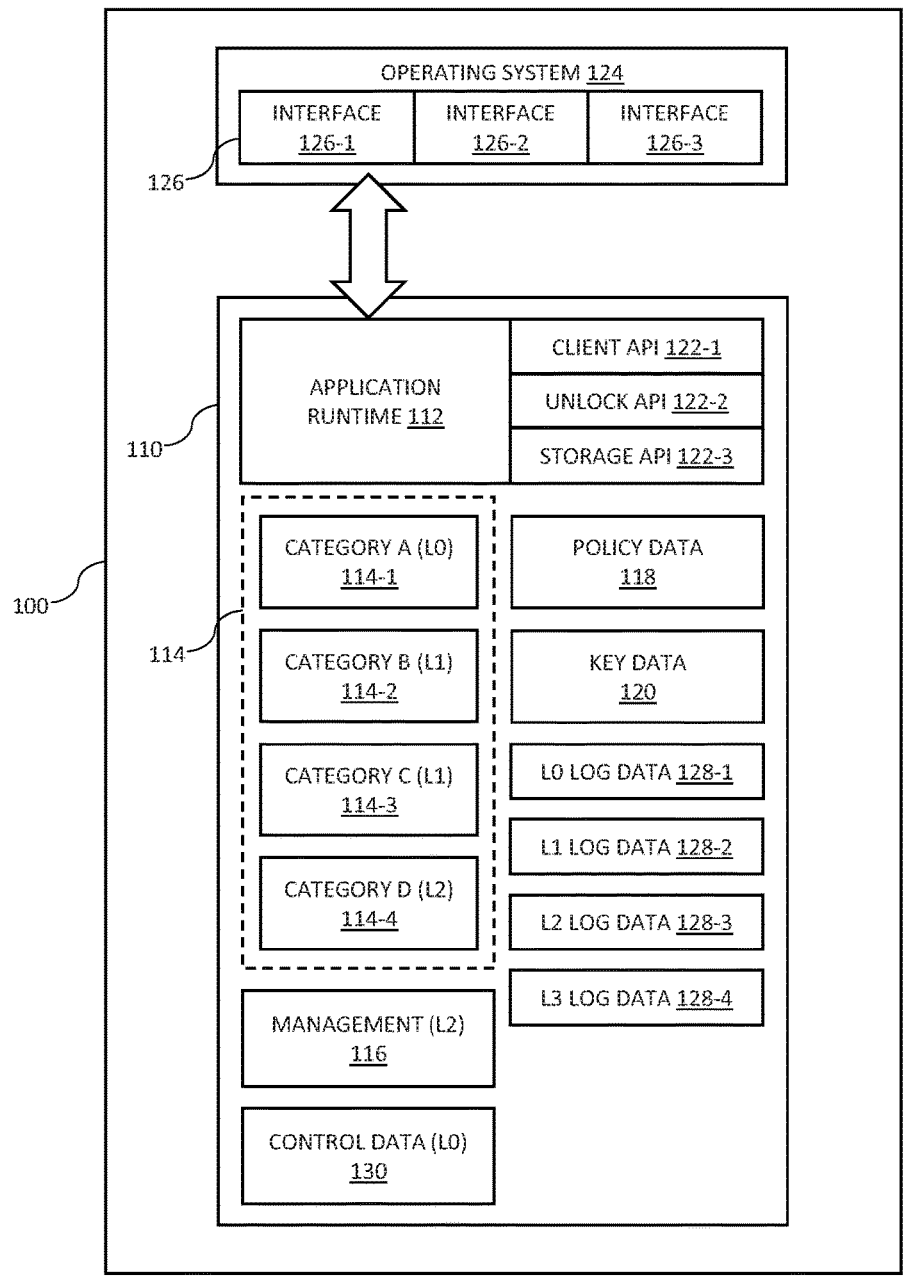
FIG. 6 is a schematic diagram showing a computing device comprising an application in accordance with a third embodiment.

According to some embodiments, the application 110 may be generate one or more logs 128-1 to 128-4 corresponding to the respective access levels defined in the policy data 118 and encrypted by the corresponding access level key stored in the key data 120, as shown in FIG. 6. The inclusion of access level specific logging ensures that the application 110 is able to stored audit and debug information regardless of the current authentication state of the application 110. When required, the logs 128-1 to 128-4 may be aggregated and uploaded to a remote server as required.

Figure 7:
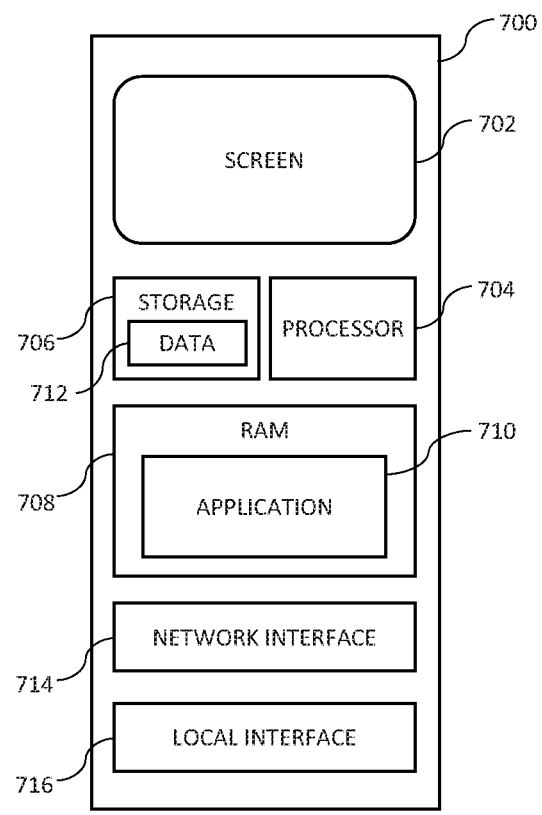
FIG. 7 is a schematic diagram showing a computing device in accordance with an embodiment.

In one use case, the computing device 100 takes the form of a portable computing device. An example of a portable computing 700 device according to an embodiment is shown schematically in FIG. 7. The portable computing device 700 may, for example, take the form of a cellular phone, a smart phone, a personal digital assistance (PDA), a tablet computer, a wearable computing device, a notebook computer, or the like. The portable computing device 700 includes a screen 702, which may be a touch screen for receipt of input from a user. Alternatively or additionally, the portable computing device 700 may include a physical keyboard (not shown), which may be integral to the portable computing device 700 or connected wirelessly or by wired connection to the portable computing device 700. The portable computing device 700 further includes a processor 704, a non-volatile (i.e. persistent) storage component 706 (such as a hard disk drive or a solid-state drive) and a volatile (i.e. non-persistent) storage component in the form of random access memory (RAM) 708. The processor, in association with an operating system, executes instructions stored in the random access memory 708 that have been loaded from the non-volatile storage device 706. These instructions are in the form of one or more processes that implement an application 710, such as the application 110 described above with reference to FIGS. 1 to 6. The random access memory 708 is also used by processes running on the processor 704 as a means for storing and accessing data in the form of electronic signals where the data is used during the execution of the processes. The operating system provides a file system for storing, modifying and accessing files held in the non-volatile storage device 706, such as the application data 114 associated with the application 110 described above with reference to FIGS. 1 to 6. The file system may be accessible to other process running on the processor 704 via the operating system. Processes running on the processor 704 also process user input obtained via the screen 702 or keyboard (not shown), etc. The portable computing device 700 also includes a network interface 714 (or a plurality of network interfaces) which allow processes running on the processor 704 to transmit and receive data to and from other devices and/or servers via a communications, using wired and/or wireless connections. Typically, the network interface 714 is implemented in a combination of software and hardware (e.g. a network interface controller) to provide the necessary network connectivity to the processes running on the processor 704. Examples of network interface 714 include a Wi-Fi™ interface and/or a cellular radio utilizing standards such as Global System for Mobile Communications (GSM), Universal Mobile Telecommunications System (UMTS), Code Division Multiple Access (CDMA), Long Term Evolution (LTE), or the like. The portable computing device 700 may also include a local communications interface 716, such as a Bluetooth™ interface or an NFC™ interface. The local communications interface 716 may also be implemented in a combination of software and hardware and provide connectivity to one or more additional computing devices in the vicinity of the portable computing device 700.

According to some embodiments, the interfaces 126 providing the operating system may provide functionality for receiving data via one or more hardware functions provided by the computing device 100. For example, one of the interfaces provided by the operating system 124 may provide functionality for receiving user input via a touchscreen, keyboard, pointer device, fingerprint scanner, camera or microphone of the computing device 100. Moreover, another of the interfaces provided by the operating system 124 may provide functionality for obtaining information regarding the current environment in which the device is operating, such as location of the computing device (e.g. via GPS module of the computing device 100), or a current network to which the computing device is connected. As discussed above, the application runtime 112 may communicate with the one or more interfaces 126 provided by the operating system 124 to receive one or more credentials for use in unlocking the application data 114. In this respect, the one or more credentials may include a password or passcode credential input by the user of the computing device 100, a biometric credential such as a fingerprint scan, voice scan or an iris scan of the user of the computing device 100, a gesture credential such as a gesture input via a touchscreen or camera associated with the computing device 100, or an environment credential such as a network identifier for a LAN to which the computing device 100 is currently connected. It will be understood from the embodiments described above, that the term "combination of credentials" encompasses a single credential or a plurality of credentials.

As discussed above, the application data 114 stored by the application 110 may include any data utilized or generated by the application runtime 112 during execution. It will therefore be apparent that the term "application data" encompasses a wide range of data types and data formats. For example, the application data 114 may include text data, email data, image data, audio data and/or video data, or any combination thereof. Similarly, the application data 114 may include corporate data and/or personal data depending on the usage of the application.

According to some embodiments, the credential policy defined by the second policy data structure 220 of FIG. 2B can optionally specify a plurality of alternative credential combinations for one or more of the access levels. For example, for a given access level, the policy data structure 220 may include a plurality of rows specifying a plurality of respective alternative credential combinations for the given access level. In this example, the first key data structure 300 would similarly include a plurality of rows for the given access level, with each row corresponding to the respective alternative credential combinations specified in the second policy data structure 220. In this manner, the application runtime 112 is able to determine whether the current authentication state comprises one of the alternative credential combinations defined for the particular access level and decrypt the corresponding encrypted access level key.

It will be appreciated that at least parts of the methods and techniques discussed above with reference to FIGS. 1 to 7 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling access to application data associated with an application configured on a computing device, the method comprising:

storing data comprising, for each of a plurality of access levels associated with the application, first data and an access level key corresponding to the respective access level, the first data indicative of a combination of one or more credentials associated with the respective access level, and the access level key being encrypted by the combination of one or more credentials associated with the respective access level, and wherein the stored data comprises a master key encrypted by the access level key corresponding to a highest access level associated with the application and the access level key corresponding to the highest access level associated with the application encrypted by the master key;

receiving a combination of one or more credentials available to the application;

determining, based on the first data, an access level in the plurality of access levels corresponding to the received combination of one or more credentials available to the application;

decrypting the access level key in the stored data corresponding to the determined access level using the received combination of one or more credentials available to the application;

providing access to encrypted application data associated with the application and corresponding to the determined access level using, at least in part, the decrypted access level key corresponding to the determined access level;

receiving, at the application, a new combination of one or more credentials corresponding to a new access level in response to an instruction to create the new access level above the highest access level associated with the application;

generating a new access level key corresponding to the new access level based, in part, on the new combination of one or more credentials received at the application;

decrypting the master key using the access level key corresponding to the highest access level associated with the application;

encrypting the new access level key corresponding to the new access level using the decrypted master key; and storing the encrypted new access level key in association with the new access level in the stored data.

2. The method of claim 1, wherein the stored data comprises, for the determined access level, one or more access level keys corresponding to one or more access levels in the plurality of access levels which are subordinate to the determined access level, each of which is encrypted using the access level key corresponding to the determined access level, the method comprising:

decrypting the one or more access level keys corresponding to the one or more access levels subordinate to the determined access level using the decrypted access level key corresponding to the determined access level; and providing access to encrypted application data associated with the application and corresponding to the one or more subordinate access levels using, at least in part, the one or more decrypted access level keys corresponding to the one or more access levels subordinate to the determined access levels.

3. The method of claim 1, wherein the stored data comprises, for each of the plurality of access levels associated with the application, one or more application data keys corresponding to the respective access level, each of which is encrypted by the access level key corresponding to the respective access level, the method comprising:

decrypting the one or more application data keys corresponding to the determined access level using the decrypted access level key corresponding to the determined access level; and decrypting the encrypted application data associated with the application and corresponding to the determined access level using the one or more decrypted application data keys.

4. The method of claim 2, wherein the stored data comprises, for each of the plurality of access levels associated with the application, one or more application data keys corresponding to the respective access level, each of which is encrypted by the access level key corresponding to the respective access level, the method comprising:

decrypting the one or more application data keys corresponding to the determined access level using the decrypted access level key corresponding to the determined access level;

decrypting the one or more application data keys corresponding to the one or more access levels subordinate to the determined access level using the one or more decrypted access level keys corresponding to the one or more access levels subordinate to the determined access level;

decrypting the encrypted application data associated with the application and corresponding to the determined access level using the one or more decrypted application data keys; and decrypting the encrypted application data associated with the application and corresponding to the one or more access levels subordinate to the determined access level using the one or more decrypted application data keys corresponding to the one or more access levels subordinate to the determined access level.

5. The method of claim 1, wherein the method further comprises:

encrypting the decrypted master key using a new level key corresponding to the new access level; and storing the encrypted master key in association with the new access level in the stored data.

6. The method of claim 1, wherein the instruction to create a new access level is received from a server remote from the computing device.

7. The method of claim 1, wherein the first data comprises meta-data indicative of the combination of one or more credentials.

8. A non-transitory computer-readable storage medium comprising computer-executable instructions which, when executed by a processor, cause a computing device to perform a method of controlling access to application data associated with an application configured on the computing device, the method comprising:

storing data comprising, for each of a plurality of access levels associated with the application, first data and an access level key corresponding to the respective access level, the first data indicative of a combination of one or more credentials associated with the respective access level, and the access level key being encrypted by the combination of one or more credentials associated with the respective access level, and wherein the stored data comprises a master key encrypted by the access level key corresponding to a highest access level associated with the application and the access level key corresponding to the highest access level associated with the application encrypted by the master key;

receiving a combination of one or more credentials available to the application;

determining, based on the first data, an access level in the plurality of access levels corresponding to the received combination of one or more credentials available to the application;

decrypting the access level key in the stored data corresponding to the determined access level using the received combination of one or more credentials available to the application;

providing access to encrypted application data associated with the application and corresponding to the determined access level using, at least in part, the decrypted access level key corresponding to the determined access level;

receiving, at the application, a new combination of one or more credentials corresponding to a new access level in response to an instruction to create the new access level above the highest access level associated with the application;

generating a new access level key corresponding to the new access level based, in part, on the new combination of one or more credentials received at the application;

decrypting the master key using the access level key corresponding to the highest access level associated with the application;

encrypting the new access level key corresponding to the new access level using the decrypted master key; and storing the encrypted new access level key in association with the new access level in the stored data.

9. The non-transitory computer-readable storage medium of claim 8, wherein the stored data comprises, for the determined access level, one or more access level keys corresponding to one or more access levels in the plurality of access levels which are subordinate to the determined access level, each of which is encrypted using the access level key corresponding to the determined access level, the method comprising:

decrypting the one or more access level keys corresponding to the one or more access levels subordinate to the determined access level using the decrypted access level key corresponding to the determined access level; and providing access to encrypted application data associated with the application and corresponding to the one or more subordinate access levels using, at least in part, the one or more decrypted access level keys corresponding to the one or more access levels subordinate to the determined access level.

10. The non-transitory computer-readable storage medium of claim 8, wherein the stored data comprises, for each of the plurality of access levels associated with the application, one or more application data keys corresponding to the respective access level, each of which is encrypted by the access level key corresponding to the respective access level, the method comprising:

decrypting the one or more application data keys corresponding to the determined access level using the decrypted access level key corresponding to the determined access level; and decrypting the encrypted application data associated with the application and corresponding to the determined access level using the one or more decrypted application data keys.

11. The non-transitory computer-readable storage medium of claim 9, wherein the stored data comprises, for each of the plurality of access levels associated with the application, one or more application data keys corresponding to the respective access level, each of which is encrypted by the access level key corresponding to the respective access level, the method comprising:

decrypting the one or more application data keys corresponding to the determined access level using the decrypted access level key corresponding to the determined access level;

decrypting the one or more application data keys corresponding to the one or more access levels subordinate to the determined access level using the one or more decrypted access level keys corresponding to the one or more access levels subordinate to the determined access level;

decrypting the encrypted application data associated with the application and corresponding to the determined access level using the one or more decrypted application data keys; and decrypting the encrypted application data associated with the application and corresponding to the one or more access levels subordinate to the determined access level using the one or more decrypted application data keys corresponding to the one or more access levels subordinate to the determined access level.

12. The non-transitory computer-readable storage medium of claim 8, wherein the method further comprises:

encrypting the decrypted master key using new level key corresponding to the new access level; and storing the encrypted master key in association with the new access level in the stored data.

13. The non-transitory computer-readable storage medium of claim 8, wherein the instruction to create a new access level is received from a server remote from the computing device.

14. The non-transitory computer-readable storage medium of claim 8, wherein the first data comprises metadata indicative of the combination of one or more credentials.

* * * * *